(12) United States Patent
Zalio et al.

(10) Patent No.: US 7,599,335 B2
(45) Date of Patent: Oct. 6, 2009

(54) CELL SEARCH PROCESS FOR WIRELESS COMMUNICATION SYSTEM

(75) Inventors: Filip Zalio, Victoria (AU); Vasic Dobrica, Victoria (AU)

(73) Assignee: NEC Corporation, Tokyo (JP)

( * ) Notice: Subject to any disclaimer, the term of this patent is extended or adjusted under 35 U.S.C. 154(b) by 387 days.

(21) Appl. No.: 10/561,192

(22) PCT Filed: Jun. 18, 2004

(86) PCT No.: PCT/JP2004/008936

§ 371 (c)(1),
(2), (4) Date: Jun. 27, 2006

(87) PCT Pub. No.: WO2004/114539

PCT Pub. Date: Dec. 29, 2004

(65) Prior Publication Data

US 2007/0010280 A1    Jan. 11, 2007

(30) Foreign Application Priority Data

Jun. 18, 2003    (AU)    ............................. 2003903075
Jun. 10, 2004    (AU)    ............................. 2004202550

(51) Int. Cl.
*H04B 7/216* (2006.01)
(52) U.S. Cl. ...................... 370/335; 370/342; 370/337
(58) Field of Classification Search ................ 370/335, 370/342, 337
See application file for complete search history.

(56) References Cited

U.S. PATENT DOCUMENTS

| 6,697,622 | B1 * | 2/2004 | Ishikawa et al. | ............ 455/434 |
| 6,731,349 | B1 * | 5/2004 | Van Der Wijst | ............. 348/732 |
| 6,731,649 | B1 * | 5/2004 | Silverman | .................. 370/466 |
| 6,816,715 | B1 * | 11/2004 | Mano | ....................... 455/161.3 |
| 7,013,140 | B2 * | 3/2006 | Ostberg et al. | .............. 455/434 |
| 7,096,016 | B2 * | 8/2006 | Hasegawa | .................... 455/434 |
| 7,292,548 | B2 * | 11/2007 | Lim et al. | ................... 370/328 |

(Continued)

OTHER PUBLICATIONS

Michell, B. Variable bandwidth RSSI scanning, Motorola Technical Developments, Aug. 1996, pp. 22-24.

*Primary Examiner*—Lester Kincaid
*Assistant Examiner*—Diego Herrera
(74) *Attorney, Agent, or Firm*—Young & Thompson

(57) ABSTRACT

A method of cell search in a wireless communication systems having a plurality of base stations and a mobile station, each of the plurality of base stations serving a separate cell within a service area and transmitting a common primary synchronization code (PSC) in a primary synchronization channel within a slot of a radio frame, the method including the steps of: (a) scanning (72) through radio channels in scanning increments corresponding to a standard channel raster; (b) estimating (98) the PSC signal-to-noise ratio of each radio channel; (c) if a PSC signal-to-noise ratio is above a first predetermined threshold level (100), completing a cell search procedure including slot synchronization, frame synchronization and scrambling code detection steps for that radio channel; (d) if the cell search procedure is successfully completed (112) for the radio channel in step (c), increasing the scanning increments to the broadcast frequency separation between cells; (e) when all radio channels are scanned in step (d), sorting (74) the scanned radio channels in descending order by PSC signal-to-noise ratio; and (f) performing (76) the cell search procedure on each sorted radio channel in descending order.

4 Claims, 4 Drawing Sheets

U.S. PATENT DOCUMENTS

| | | | | |
|---|---|---|---|---|
| 7,369,534 B2 * | 5/2008 | Amerga et al. | | 370/350 |
| 2002/0015399 A1 * | 2/2002 | Hirade | | 370/342 |
| 2002/0034944 A1 * | 3/2002 | Tanno et al. | | 455/434 |
| 2002/0177458 A1 * | 11/2002 | Hokao | | 455/502 |
| 2003/0076801 A1 * | 4/2003 | Aikawa et al. | | 370/336 |
| 2003/0086512 A1 * | 5/2003 | Rick et al. | | 375/343 |
| 2003/0202541 A1 * | 10/2003 | Lim et al. | | 370/503 |
| 2004/0100935 A1 * | 5/2004 | Papageorgiou et al. | | 370/342 |
| 2004/0116110 A1 * | 6/2004 | Amerga et al. | | 455/422.1 |
| 2004/0161020 A1 * | 8/2004 | Mathew et al. | | 375/149 |
| 2004/0196893 A1 * | 10/2004 | Oh et al. | | 375/148 |
| 2004/0203839 A1 * | 10/2004 | Ostberg et al. | | 455/455 |
| 2004/0252656 A1 * | 12/2004 | Shiu et al. | | 370/328 |
| 2005/0008040 A1 * | 1/2005 | Becker et al. | | 370/503 |
| 2005/0075125 A1 * | 4/2005 | Bada et al. | | 455/525 |
| 2007/0025428 A1 * | 2/2007 | Hahm et al. | | 375/149 |
| 2008/0181195 A1 * | 7/2008 | Cho et al. | | |

* cited by examiner

CELL SEARCH PROCESS FOR WIRELESS COMMUNICATION SYSTEM

BACKGROUND OF THE INVENTION

The present invention relates generally to wireless communication systems having a plurality of base stations and a mobile station, and in particular to the cell search process performed by the mobile station. The present invention is suitable for use in spread spectrum systems, and in particular in wide band code division multiple access (W-CDMA) systems, and it will be convenient to describe the invention in relation to that exemplary, non-limiting application.

In W-CDMA and like wireless communication systems, a mobile station can receive a number of radio signals transmitted from several base stations—each serving a separate cell within a service area—via multiple propagation paths. A cell search process is carried out by the mobile station to synchronise the mobile station with a base station of a cell prior to transmission of traffic data, such as voice data.

The standard cell search process involves three steps, namely slot synchronisation, code-group identification and frame synchronisation, and long scrambling code identification. During slot synchronisation, the mobile station uses a primary synchronisation code continuously transmitted in a primary synchronisation channel to acquire slot synchronisation to a cell. During the second step of the cell search procedure, the mobile station uses the synchronisation channel's secondary synchronisation code to find frame synchronisation and identify the code group of the cell found in the slot synchronisation step. During the third step of the cell search procedure, the mobile station determines the exact primary scrambling code used by the found cell.

In a W-CDMA mobile station, it is sometimes necessary to perform a cell search of all supported radio channels to try to find downlink signals from all visible cells. W-CDMA radio channels are specified on a grid with a resolution, or channel raster, of 200 kHz (in the case of the UMTS Standard). The standard cell search process carried out by existing mobile stations is to progress through each possible radio channel and perform a full cell search process on each one. The cell search process therefore takes a significant time and the resulting full band scan may take several minutes. Moreover, the standard cell search process requires significant processing power and time, which occupies resources that may be required for other processing functions and consumes power in the mobile station.

It would therefore be desirable to provide a cell search process that ameliorates or overcomes one or more disadvantages of known cell search processes carried out by mobile stations in wireless communication systems.

It would also be desirable to provide a cell search process that is rapid, and minimising the processing power and energy requirements of a mobile station.

SUMMARY OF THE INVENTION

One aspect of the invention provides a method of cell search in a wireless communication systems having a plurality of base stations and a mobile station, each of the plurality of base stations serving a separate cell within a service area and transmitting a common primary synchronisation code (PSC) in a primary synchronisation channel within a slot of a radio frame, the method including the steps of:

(a) scanning through radio channels in scanning increments corresponding to a standard channel raster;

(b) estimating the PSC signal-to-noise ratio of each radio channel;

(c) if a PSC signal-to-noise ratio is above a first predetermined threshold level, completing a cell search procedure including slot synchronisation, frame synchronisation and scrambling code detection steps for that radio channel;

(d) if the cell search procedure is successfully completed for the radio channel in step (c), increasing the scanning increments to the broadcast frequency separation between cells;

(e) when all radio channels are scanned in step (d), sorting the scanned radio channels in descending order by PSC signal-to-noise ratio; and (f) performing the cell search procedure on each sorted radio channel in descending order.

Using this method, a cell is typically identified within the first few channels. The resulting time for a full band scan is normally only a few seconds, compared to the several minutes required to carry out the current cell search process.

Preferably, if the cell search procedure defined by steps (a) to (f) is not successful, the method includes the step of:

if more than a predetermined number of sorted radio channels have been searched without detecting cells on any of the searched radio channels, discontinuing the cell search procedure.

Another aspect of the invention provides a mobile station for use in a wireless communication system including a plurality of base stations^ each of the plurality of base stations serving a separate cell within a service area and transmitting a common primary synchronisation code (PSC) in a primary synchronisation channel within a slot of a radio frame, the mobile station including:

scanning means for scanning through possible radio channels;

cell search means for completing a cell search procedure including slot synchronisation means, frame synchronisation means and scrambling code detection means; and processing means for controlling operation of the mobile station, wherein the scanning means scans through possible radio channels in scanning increments corresponding to a standard channel raster;

the slot synchronisation means estimates the PSC signal-to-noise ratio of each radio channel;

the cell search means acts to complete the cell search procedure for that radio channel, if the processing means determines that the PSC signal-to-noise ratio is above a first predetermined threshold level;

the processing means increasing the scanning increments to the broadcast frequency separation between cells, if the cell search procedure is successfully completed for that radio channel;

the processing means further acting to sort the scanned radio channels in descending order by PSC signal-to-noise ratio when all radio channels are scanned;

the cell search means performing the cell search procedure on each sorted radio channel in descending order.

The following description refers in more detail to the various features of the present invention. To facilitate an understanding of the invention, reference is made in the description to the accompanying drawings where the cell search method and mobile station for carrying out the cell search method are illustrated in a preferred embodiment. It is to be understood however that the invention is not limited to the preferred embodiment illustrated in the drawings.

DESCRIPTION OF PREFERRED EMBODIMENT

Figure 1:
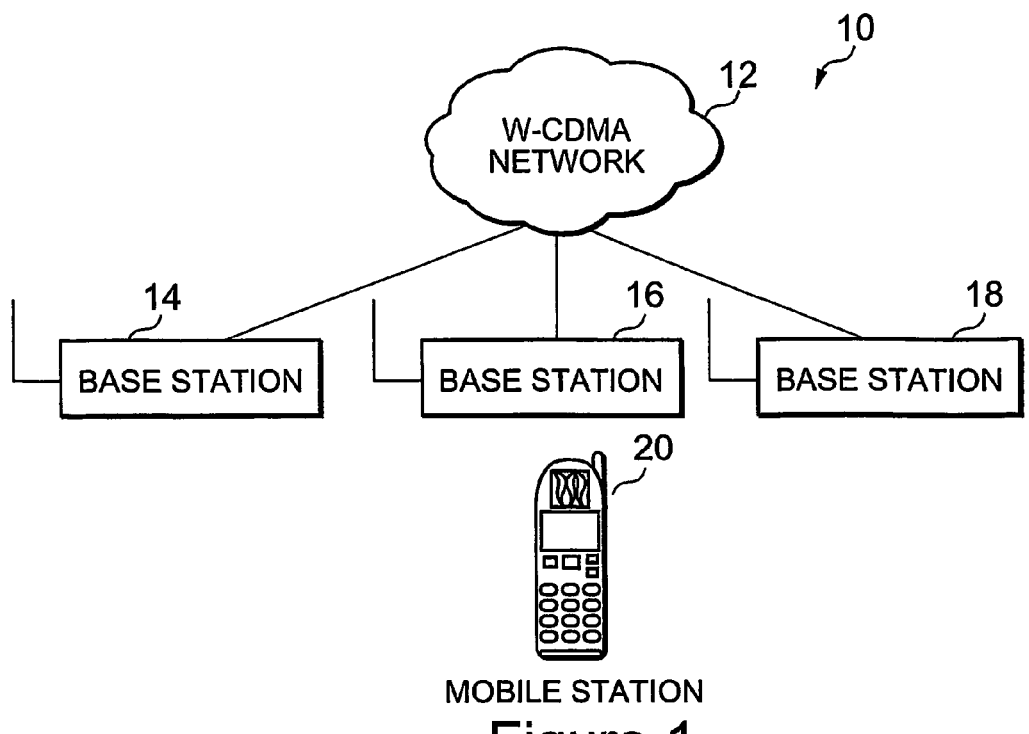
FIG. 1 is a schematic diagram illustrating a W-CDMA wireless communication systems.

Referring now to FIG. 1, there is shown generally a -wireless communication system 10 including a W-CDMA network 12 and base stations 14, 16 and 18, A mobile station 20 can receive a number of radio signals transmitted from cells served by the base stations 14 to 18 via multiple propagation paths. When the mobile station 20 performs a cell search, it receives a plurality of multi-path radio signals originating from the base stations 14 to 18, which are shifted in timing from each other due to signal reflection and diffraction.

Figure 2:
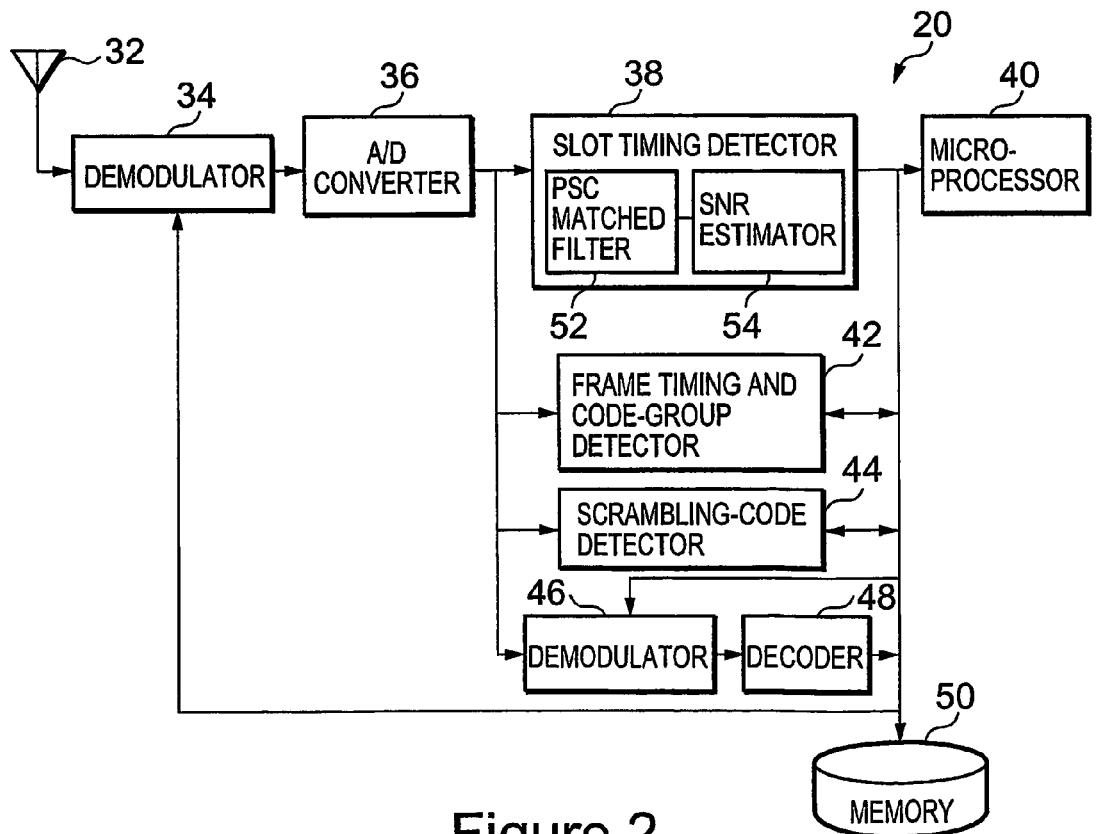
FIG. 2 is a schematic diagram of functional elements of a mobile station forming part of the wireless communication systems of FIG. 1.

FIG. 2 is a schematic diagram showing a schematic structure of the mobile station 20. This mobile station 29 includes an antenna 32, a demodulator for down converting the radio signals received by the antenna 32 to a base band frequency, and analogue to digital converter 36 which converts received analogue signals into digital signals, a slot timing detector 3B for detecting slot timing during cell search, a frame timing and code-group detector 42 which detects frame timing and code-group during cell search, a scrambling-code detector 44 which detects a scrambling-code during cell search, a demodulator 46 which demodulates a received code with detected spread codes, a decoder 48 which decodes the received signals demodulated by the demodulator 46, a microprocessor 40 which controls operation of the mobile station 20 and a memory 50 for storing a program to be executed by the microprocessor 40 as well as data required by the microprocessor 40 in the performance of its various operations. The slot timing detector 38 additionally includes a filter 52 matched to the primary synchronisation code (PSC) transmitted in a primary synchronisation channel by the base stations 14 to 18, and a signal-to-noise estimator 54.

The operation of the mobile station 20 in the performance of a cell search according to one embodiment of the present invention will now be described with reference to FIGS. 3 to 5. At step 72, the first phase of the W-CDMA band scan is conducted. In this phase, a scan is performed through all possible radio channels, estimating and storing the primary synchronisation channel signal-to-noise ratio. The scanning increment corresponds to the standard W-CDMA system channel raster. In the case of the UMTS standard, this channel raster is 200 kHz.

If the signal-to-noise ratio is above a first predetermined threshold value, a standard cell search process is performed. The first predetermined threshold value is selected so that a signal has a high likelihood of belonging to an actual cell, rather than being a random noise peak. If the cell search process is successful, namely the mobile station is able to synchronisation with a cell broadcast channel, the scanning increment is modified to a value corresponding to the frequency separation between cells. For the UMTS Standard, the frequency separation between cells is 5 MHz. Information about the located cell is stored within the mobile station.

At step 74, after scanning through all radio channels in this manner, the radio channels are then sorted in descending order, by the primary synchronisation channel signal-to-noise ratio.

At step 76, the second phase of the W-CDMA band scan is carried out. Accordingly, the mobile terminal then starts to progress through the sorted radio channels. Each next channel is selected from the sorted list in such a way that there is at least 5 MHz apart from channels on which any cells have already been identified. Once a channel is selected, a full cell search process is performed on this channel. If the cell search is successful, information about the found cell is stored in the memory of the mobile station. The mobile station then progresses to the next channel in the sorted list and a full cell search process again performed on that channel. Thus, the W-CDMA band scan is executed in the first and the second phases (steps 72 and 76) at different frequency intervals, namely, 200 kHz an 5 MHz, as illustrated in FIG. 3.

Figure 3:
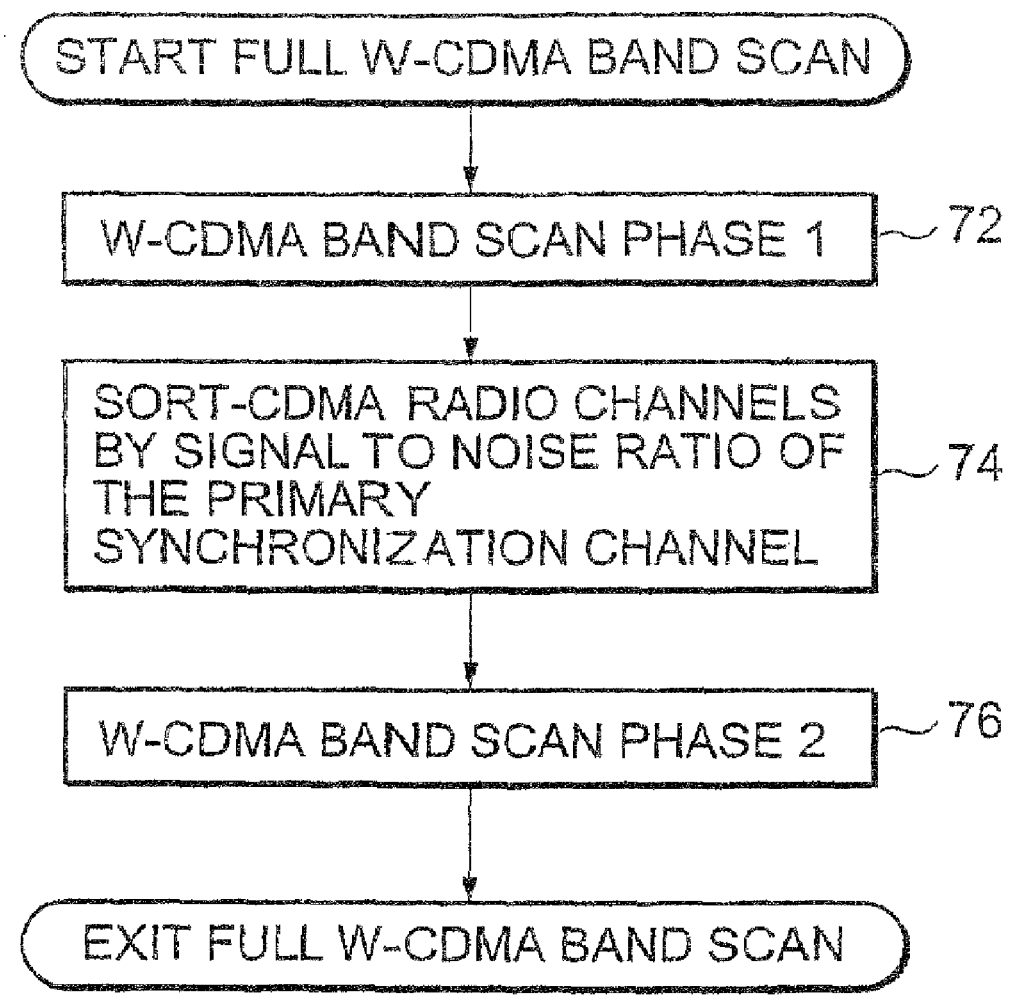
FIG. 3 is a flow chart illustrating the broad functional steps performed by the mobile station of FIG. 2 when carrying out a cell search in accordance with one embodiment of the present invention; and, FIGS. 4 and 5 are flow charts showing in more detail the various functional steps carried out by the mobile station of FIG. 2 in performing two of the steps shown in the flow chart of FIG. 3.
Figure 4:
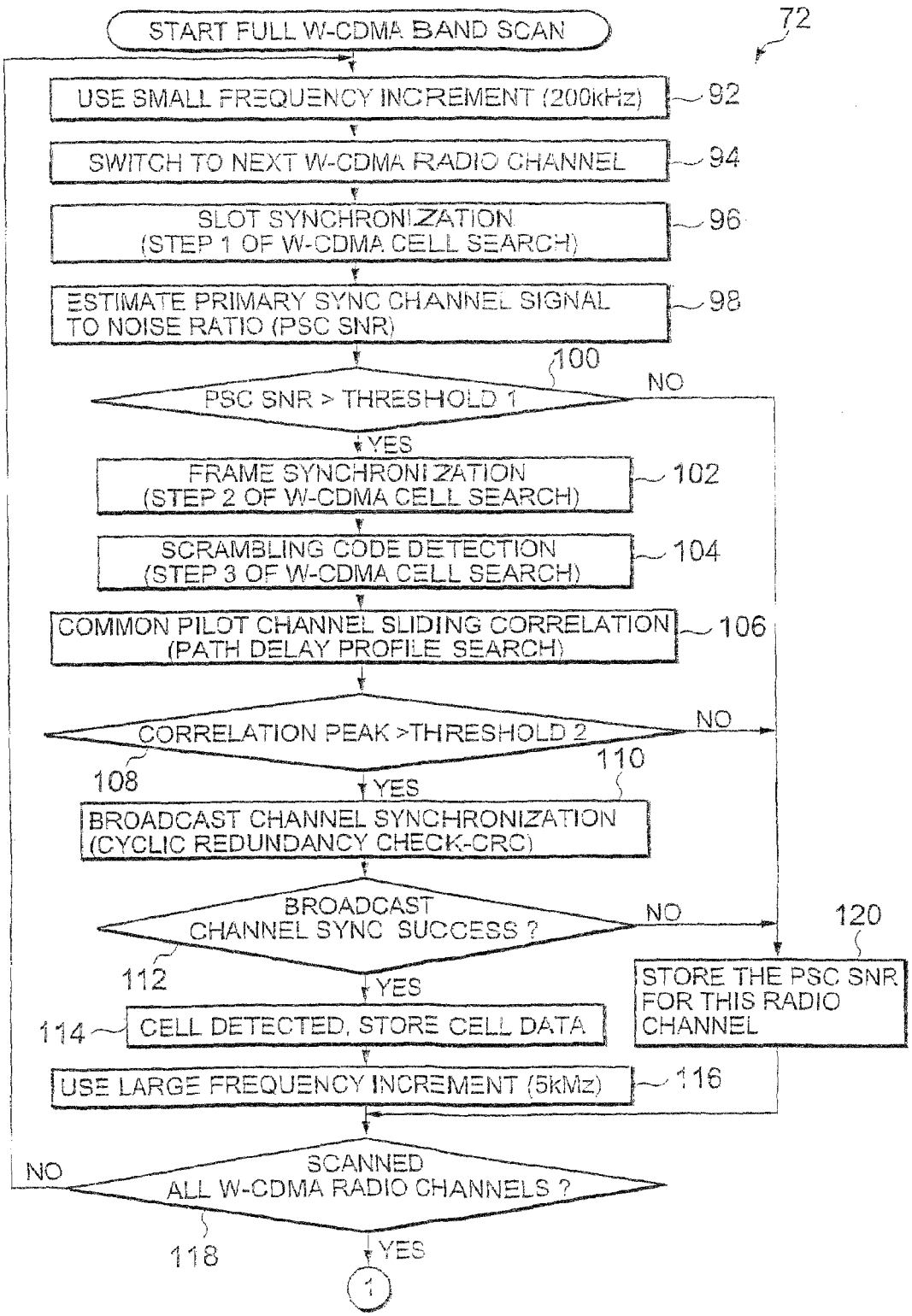
Figure 5:
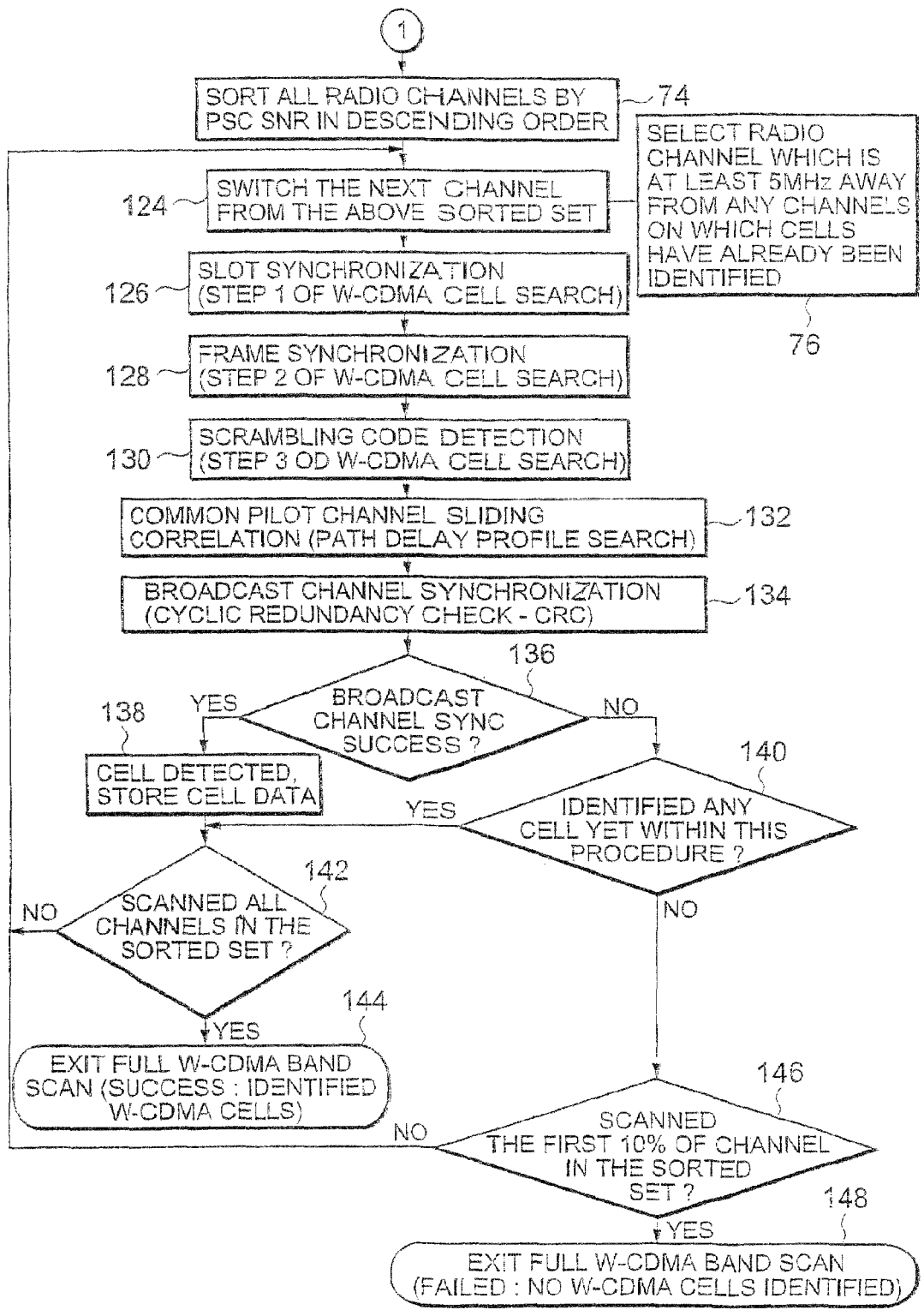

A more detailed understanding of the cell search process illustrated in FIG. 3 is shown in FIGS. 4 and 5. In FIG. 4, at step 92, the microprocessor 40 acts to demodulate the received radio signals to a first possible radio channel within the band to be scanned. The microprocessor 40 acts to adjust the demodulator 34 by 200 kHz each time a cell search process is undertaken for a new W-CDMA radio channel. At step 94, a next W-CDMA radio channel is selected.

At step 96, the first step of the cell search procedure is carried out by the mobile station, namely slot synchronisation. In this step, the mobile station uses the synchronisation channel's primary synchronisation code to acquire slot synchronisation to a cell. After the received signal is demodulated to a base band signal by the demodulator 34, and converted into a digital representation of that signal by the A/D converter 36, the digitised signal is processed by the matched filter 52. The matched filter 52 is matched to the primary synchronisation code transmitted by all base stations in a primary synchronisation channel within a slot of a radio frame. The output of the matched filter 52 is a series of pulses which represent the magnitudes of the received primary synchronisation code power for those cells detected by the matched filter 52. The signal-to-noise estimator 54 is coupled to the matched filter 52 and estimates the primary synchronisation code signal-to-noise ratio of the radio channel for which cell search process is currently being conducted.

At step 98, the primary synchronisation channel signal-to-noise ratio is derived and proved to the microprocessor 40. At step 100, a determination is made by the microprocessor 40 as to whether the signal-to-noise ratio is above a first predetermined threshold level indicative that the radio signal has a high likelihood of belonging to an actual cell. If the first predetermined threshold level is not exceeded, then the PSC signal-to-noise ratio for this radio channel is stored by the microprocessor 40 in the memory 50.

Alternatively, if the first predetermined threshold level is exceeded at step 100, the second step of the W-CDMA cell search is carried out, namely frame synchronisation. During this step, the mobile station uses the search channel's secondary synchronisation code to find frame synchronisation and identify the code group of the cell found in the slot synchronisation step. This is done by correlating the received signal with all possible secondary synchronisation code sequences, and identifying a maximum correlation value. Since the cyclic shifts of the sequences are unique, the code-group as well as the frame synchronisation is determined by the frame timing and code-group detector 42.

At step 104, step 3 of the W-CDMA cell search process is carried out, namely scrambling-code detection. In this third step, the mobile station determines the exact primary scrambling code used by the found cell. The primary scrambling code is typically identified through symbol-by-symbol correlation over the CPICH with all codes within the code group identified in the second frame synchronisation and code-group identification step.

At step 106, a common pilot channel sliding correlation is performed. If the correlation peak is determined at step 108 as being less than a second predetermined threshold level, then the cell search process for that radio channel is stopped, and the PSC signal-to-noise ratio for that radio channel is stored in the memory 50. However, if the correlation peak is above the second predetermined threshold level. a broadcast channel synchronisation step is performed at step 110. If it is determined at step 112 that broadcast channel synchronisation was not successful, then once again the cell search process for that radio channel is stopped and the PSC signal-to-noise ratio is stored in the memory 50 at step 120. However, if the broadcast channel synchronisation was successful, then at step 114 the cell is determined to have been detected by the cell search process and information about the found cell is stored in the cell list maintained in the memory 50 of the mobile station.

At step 116, the scanning increments for the cell search process are increased to the broadcast frequency separation between cells. For the UMTS Standard, this is 5 MHz. If at step 118 it is found that all W-CDMA radio channels have yet to be scanned, the next W-CDMA radio channel for which the cell search process is to be conducted is selected and steps 94 to 120 repeated. It will be appreciated that if the mobile station does not synchronise the radio channel in question, the next W-CDMA radio channel selected will be incremented by 200 kHz, whereas if the mobile station has synchronised the cell broadcast channel, then the next W-CDMA radio channel will be incremented by 5 MHz from the previous radio channel.

Having now scanned through all radio channels in the manner illustrated in FIG. 4, the radio channels are then sorted in descending order by the microprocessor 40 by the PSC signal-to-noise ratio at step 74.

As seen in FIG. 5, the mobile terminal then progresses its way through the sorted radio channels, conducting a full cell search process on each. At step 124, the next channel to be searched by the mobile station is selected. At steps 126, 128 and 130 the slot synchronisation, frame synchronisation and scrambling-code detection steps of the W-CDMA cell search are conducted in the manner preciously described. In steps 132 and 134, the common pilot channel sliding correlation and broadcast channel synchronisation steps previously described are then carried out.

If it is determined at step 136 that the broadcast channel synchronisation steps was successful, then at step 138 the radio signal currently being searched is determined to belong to an actual cell, and cell data is stored in the cell list maintained in the memory 50 of the mobile station. Alternatively, if the broadcast channel synchronisation was not successful, then at step 140 the microprocessor 40 determines whether any cells have yet been identified in the cell search procedure according to the present invention.

If one or more cells have been identified in this manner, or if the broadcast channel synchronisation was successful, then another determination is made at step 142 as to whether all radio channels in the set of radio channels sorted according to PSC signal-to-noise ratio have been scanned. If this is not the case, then the next channel is selected from the sorted list at step 124, that radio channel being selected in a way which is at least 5 MHz away from any channels on which cells have already been identified. The cell search process for that next channel is then carried out. Once all sorted channels have been scanned, the W-CDMA band scan is completed at step 144.

However, if the broadcast channel synchronisation was not successful, as determined by step 136 and if no cells had yet been identified within this procedure, as determined by step 140, then a determination is made by the microprocessor 40 at step 146 as to whether the first 10% of channels in the sorted set have already been scanned. If this is not the case, then the next and subsequent channels from the sorted set are scanned to determine whether any cells are detected. If, however, the first 10% of the channels in the sorted set have already been scanned, then the W-CDMA band scan is determined at step 148 to have failed.

Accordingly, if the cell search is not successful, the mobile station checks whether it has identified any cell so far. If not and it has already progressed through 10% of the sorted channel set, the procedure is terminated, as there is now a very low likelihood that there are any detectable cells on any of the system's radio channels.

It is to be understood that modifications or additions may be made to the above described preferred embodiment of the invention without departing from the spirit or ambit of the present invention,

The invention claimed is:

1. A method of cell search in a wireless communication systems having a plurality of base stations and a mobile station, each of the plurality of base stations serving a separate cell within a service area and transmitting a common primary synchronization code (PSC) in a primary synchronization channel within a slot of a radio frame, the method including the steps of:
    (a) scanning through radio channels in scanning increments corresponding to a standard channel raster;
    (b) estimating the PSC signal-to-noise ratio of each radio channel;
    (c) when a PSC signal-to-noise ratio is above a first predetermined threshold level, completing a cell search procedure including slot synchronization, frame synchronization and scrambling code detection steps for that radio channel;
    (d) when the cell search procedure is successfully completed for the radio channel in step (c), increasing the scanning increments to the broadcast frequency separation between cells;
    (e) when all radio channels are scanned in step (d), sorting the scanned radio channels in descending order by PSC signal-to-noise ratio; and
    (f) performing the cell search-procedure on each sorted radio channel in descending order.

2. A method of cell search according to claim 1, wherein when the cell search procedure defined by steps (a) to (f) is not successful, the method includes the step of:
    when more than a predetermined number of sorted radio channels have been searched without detecting cells on any of the searched radio channels, discontinuing the cell search procedure.

3. A mobile station for use in a wireless communication system including a plurality of base stations, each of the plurality of base stations serving a separate cell within a service area and transmitting a common primary synchronization code (PSC) in a primary synchronization channel within a slot of a radio frame, the mobile station including:
    scanning means for scanning through possible radio channels;

cell search means for completing a cell search procedure including slot synchronization means, frame synchronization means and scrambling code detection means; and processing means for controlling operation of the mobile station, wherein the scanning means scans through possible radio channels in scanning increments corresponding to a standard channel raster;

the slot synchronization means estimates the PSC signal-to-noise ratio of each radio channel;

the cell search means acts to complete the cell search procedure for that radio channel, when the processing means determines that the PSC signal-to-noise ratio is above a first predetermined threshold level;

the processing means increasing the scanning increments to the broadcast frequency separation between cells, when the cell search procedure is successfully completed for that radio channel;

the processing means further acting to sort the scanned radio channels in descending order by PSC signal-to-noise ratio when all radio channels are scanned; and the cell search means performing the cell search procedure on each sorted radio channel in descending order.

4. A mobile station according to claim 3, wherein, when the cell search procedure is not successful, the processing means acts to:

discontinue the cell search procedure when more than a predetermined number of sorted radio channels have been searched without detecting cells on any of the searched radio channels.

* * * * *

UNITED STATES PATENT AND TRADEMARK OFFICE
CERTIFICATE OF CORRECTION

PATENT NO. : 7,599,335 B2  Page 1 of 1
APPLICATION NO. : 10/561192
DATED : October 6, 2009
INVENTOR(S) : Zalio et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 678 days.

Signed and Sealed this

Twenty-eighth Day of September, 2010

David J. Kappos
*Director of the United States Patent and Trademark Office*